United States Patent
McEldowney

(10) Patent No.: US 9,557,574 B2
(45) Date of Patent: Jan. 31, 2017

(54) DEPTH ILLUMINATION AND DETECTION OPTICS

(75) Inventor: Scott McEldowney, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 454 days.

(21) Appl. No.: 12/796,472

(22) Filed: Jun. 8, 2010

(65) Prior Publication Data
US 2011/0298918 A1    Dec. 8, 2011

(51) Int. Cl.
*G02B 27/28* (2006.01)
*G01C 3/08* (2006.01)
*G06F 3/03* (2006.01)
*G02B 27/48* (2006.01)

(52) U.S. Cl.
CPC ............. *G02B 27/286* (2013.01); *G01C 3/08* (2013.01); *G06F 3/0304* (2013.01); *G02B 27/48* (2013.01)

(58) Field of Classification Search
CPC ....... G01C 3/08; G06F 3/0304; G02B 27/286; G02B 27/48
USPC .......................................................... 348/136
See application file for complete search history.

(56) References Cited

U.S. PATENT DOCUMENTS

| | | |
|---|---|---|
| 3,620,593 A | 11/1971 | Tackaberry |
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

"Circular Polarization", circular polarization—elliptical polarization—quarter-wave retardation plate—birefringence, webpage, retrieved Jan. 19, 2010, http://www.fas.harvard.edu/~scidemos/LightOptics/CircularPolarization/CircularPolarization.html.

(Continued)

*Primary Examiner* — Behrooz Senfi
*Assistant Examiner* — Maria Vazquez Colon
(74) *Attorney, Agent, or Firm* — Gregg Wisdom; Judy Yee; Micky Minhas

(57) ABSTRACT

A depth image capture device uses a circular polarization structure positioned at the output of an illumination radiation source, such as a diode laser. A linear polarization element receives the collimated illumination radiation and provides polarized radiation to a quarter wave plate. Radiation exits the quarter wave plate as circularly polarized radiation and is provided to a diffractive optical element outputting a pattern to illuminate a target. A detector receives a reflection of the output pattern from the target.

20 Claims, 6 Drawing Sheets

(56) References Cited

U.S. PATENT DOCUMENTS

| | | | |
|---|---|---|---|
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,161,053 A * | 11/1992 | Dabbs | 359/384 |
| 5,182,735 A * | 1/1993 | Kurtz et al. | 369/13.29 |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,790,242 A * | 8/1998 | Stern | G01S 17/89 356/4.04 |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,449,089 B1 | 9/2002 | Moshrefzadeh et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 6,965,108 B2 * | 11/2005 | Bynum et al. | 250/341.1 |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,184,088 B1 * | 2/2007 | Ball | 348/348 |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,342,719 B1 | 3/2008 | Kalmanash et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |

(56) References Cited

U.S. PATENT DOCUMENTS

| | | | |
|---|---|---|---|
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,714,997 B2* | 5/2010 | Shibata et al. | 356/237.2 |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 7,907,750 B2* | 3/2011 | Ariyur et al. | 382/103 |
| 8,009,871 B2* | 8/2011 | Rafii | G06K 9/00201 250/559.07 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2007/0134615 A1* | 6/2007 | Lovely | 433/29 |
| 2008/0026838 A1 | 1/2008 | Dunstan et al. | |
| 2009/0087192 A1* | 4/2009 | Leard et al. | 398/152 |
| 2009/0257106 A1 | 10/2009 | Tan et al. | |
| 2009/0303572 A1 | 12/2009 | Grasser et al. | |
| 2010/0008588 A1* | 1/2010 | Feldkhun | G01B 11/2518 382/206 |
| 2012/0017153 A1 | 1/2012 | Matsuda et al. | |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2006001444 A1 | 1/2006 |

OTHER PUBLICATIONS

Wallace, "Improving Depth Image Acquisition Using Polarized Light", Revised Oct. 11, 1998, published in the International Journal of Computer Vision, vol. 32, Issue 2, 1999, pp. 87-109, Kluwer Academic Publishers, Manufactured in the Netherlands.

Manset, "Polarization of Light: from Basics to Instruments", Microsoft Powerpoint, 85 pages, retrieved Jan. 19, 2010, Canada-France-Hawaii Telescope (CFHT), www.cfht.hawaii.edu/~manset/PolarizationLightIntro.ppt.

Trisnadi, "Speckle Contrast Reduction in Laser Projection Displays", Proceedings of SPIE, pp. 131-137, vol. 4657, Apr. 26, 2002.

Yurlov, "Speckle Suppression in Scanning Laser Display", Applied Optics, pp. 179-187, vol. 47, Issue 2, Jan. 10, 2008.

Toyama, Kentaro, et al., "Probabilistic Tracking in a Metric Space," Eighth International Conference on Computer Vision, Vancouver, Canada, vol. 2, Jul. 2001, 8 pages.

Office Action dated May 10, 2013, in Chinese Patent Appl. No. 201110165201.3 filed Jun. 7, 2011.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Notice of Allowance dated Jan. 10, 2014, in Chinese Patent Application No. 201110165201.3 filed Jun. 7, 2011.

Response to Office Action dated Jun. 6, 2013, Chinese Patent Application No. 2011101652013.

Office Action dated Sep. 9, 2013, Chinese Patent Application No. 2011101652013.

(56) References Cited

OTHER PUBLICATIONS

Response to Office Action dated Sep. 27, 2013, Chinese Patent Application No. 2011101652013.

* cited by examiner

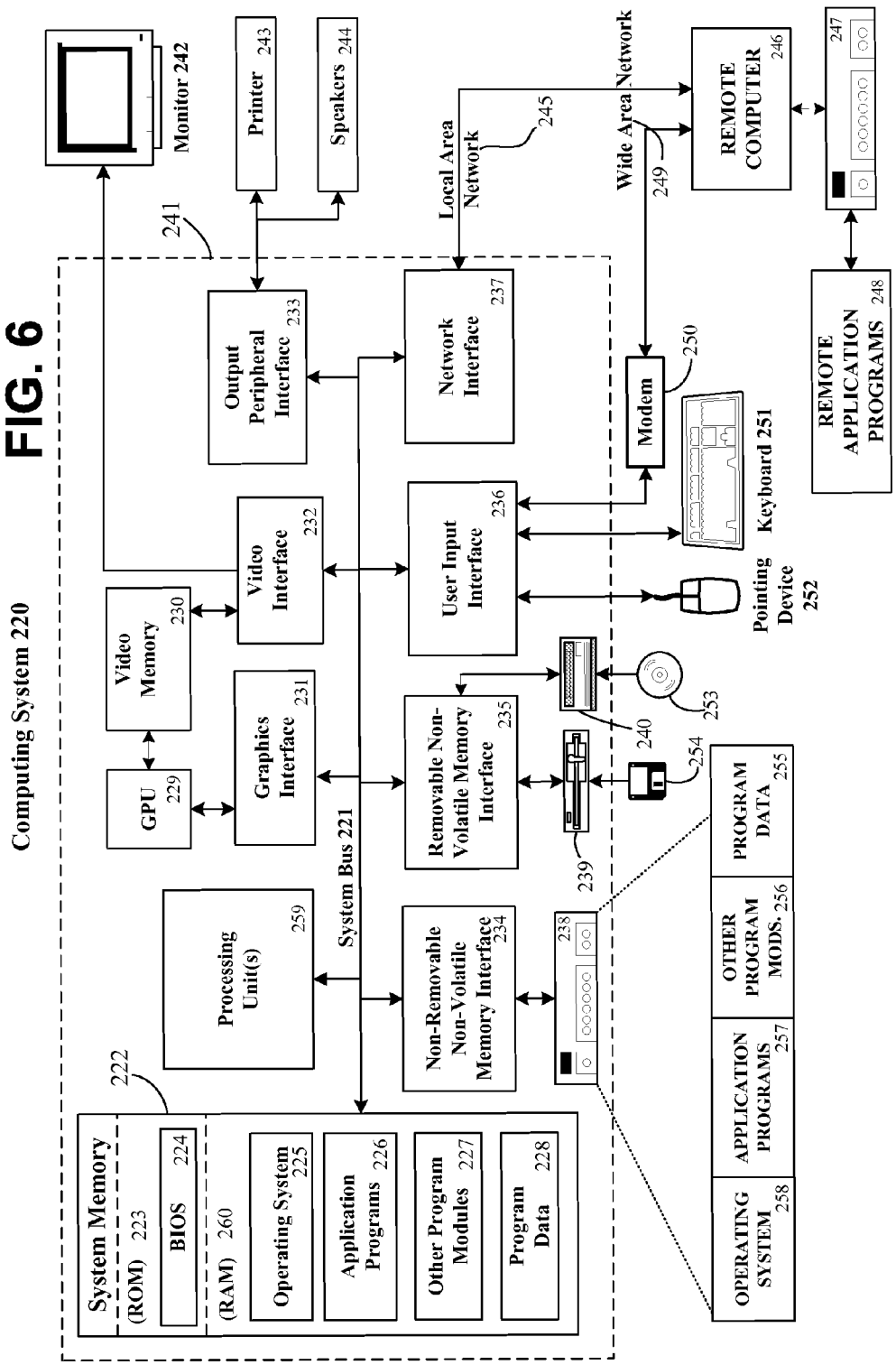

DEPTH ILLUMINATION AND DETECTION OPTICS

BACKGROUND

Depth sensing camera systems can be used for a variety of purposes, all of which depend on the accuracy of the data received from the object whose depth is to be detected. Many such systems use a projector to illuminate a target with a random or pre-defined pattern, and which detect the distance to the target using data from the reflection. Data from the pattern is used by a depth sensor to determine depth information.

One type of system uses a laser or laser diode as a projector. An issue with at least one current design is the stability of the wavelength of the laser. Detection systems are designed to read reflections based on the output wavelength of the laser. While lasers operating at constant current and temperatures have negligible wavelength fluctuations, optics used with such systems may destabilize the wavelength due to optical feedback from the optics in the system. An additional issue with use of laser light as an illumination source is that when the coherent light from the laser is re-imaged to the detector, there is noise in the form of a speckle pattern. This creates a fundamental limit as to how accurately one can determine the position of the feature in the image.

SUMMARY

Technology is provided for an efficient image sensor device. The device uses optics which both reduce the speckle pattern generated from a laser illumination source as well as eliminate reflection from optical elements back to the laser source.

In one embodiment, an image capture device in accordance with the present technology includes a circular polarization structure positioned at the output of an illumination radiation source, such as a diode laser. The structure creates circularly polarized illumination radiation emanating from the illumination radiation source. In one embodiment, the illumination is in the infrared spectrum. Light reflected from other optical elements in the image sensor device to linear polarized light but in an orientation orthogonal to the original orientation. This orthogonal polarization state will not interact with the emitted mode of the laser and thus not cause the laser to become unstable.

In a further embodiment, the technology provides a capture device for illumination and detection system for a motion detection and tracking system. The device includes a laser outputting illumination radiation and a collimating lens positioned to receive the illumination radiation and provide collimated illumination radiation. A linear polarization element receives the collimated illumination radiation and provides polarized radiation to a quarter wave plate. Radiation exits the quarter wave plate as circularly polarized radiation and is provided to a diffractive optical element outputting a pattern to illuminate a target. A detector receives a reflection of the output pattern from the target.

BRIEF DESCRIPTION OF THE DRAWINGS

FIG. 6 illustrates a second example embodiment of a computing system that may be used to track motion and update an application based on the tracked motion.

DETAILED DESCRIPTION

Technology is provided for an image sensor device with optics which both reduce the speckle pattern generated from a laser illumination source as well as eliminate reflection from optical elements back to the laser source. The technology includes optical elements on the illumination portion of a capture device which creates circularly polarized illumination radiation emanating from the illumination source. In one embodiment, the illumination is in the infrared or near infrared spectrum. The circular polarizer may comprise a quarter wave plate provided between the output of the laser and dispersion optics, or a quarter wave plate in combination with a linear polarizer.

In one aspect, the quarter wave plate will convert linear polarized light of a correct orientation from the laser to circularly polarized light. Any light reflected from other optical elements will be converted back to linear polarized light but in an orientation orthogonal to the original orientation. This orthogonal polarization state will not interact with the emitted mode of the laser and thus not cause the laser to become unstable. If additional isolation is required, a polarizer (aligned to the orientation of the original polarizer) can be inserted before the quarter wave plate thus absorbing any energy reflected.

The technology takes advantage of the use of circularly polarized illumination radiation. Circular polarization consists of two orthogonal linear polarized states at a 90 degree phase difference. These two orthogonal states cannot interact and thus cannot form speckle on reflection. That the degree of speckle (measure as the speckle contrast ratio) will be reduced by a factor of the square root of 2, thus improviding the depth accuracy and reducing the frequency in which no depth errors will occur.

Figure 1:
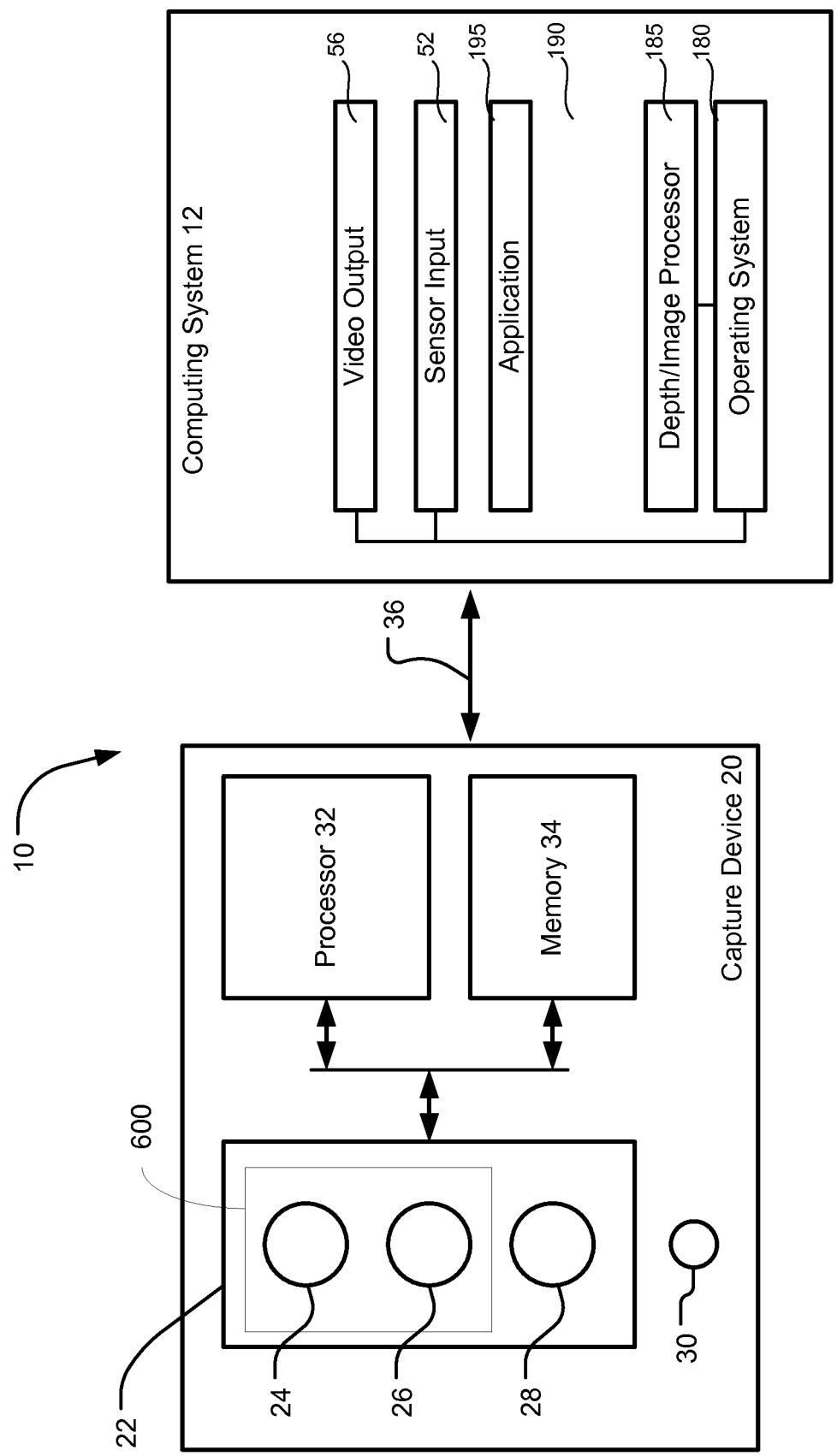
FIG. 1 illustrates an example embodiment of a tracking system with a user playing a game.

FIG. 1 illustrates an example embodiment of a capture device 20 that may be used as a depth or distance detection system. In one embodiment, the capture device may be used in a target recognition, analysis, and tracking device. The device tracks a target in a scene, where the target can be a user or an object. According to an example embodiment, the capture device 20 may be configured to capture depth information from a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 1, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 1, according to an example embodiment, the image camera component 22 may include an IR light component 24, a first sensor such as a three-dimensional (3-D) camera 26, and a second sensor such as an RGB camera 28 that may be used to capture the depth image of a scene. Each of these components is focused on a scene. For example, in time-of-flight analysis, the IR light component 24 of the capture device 20 may emit an infrared light onto the scene and may then use sensors 26 (discussed below) to detect the backscattered light from the surface of one or more targets and objects in the scene using, for example, the a 3-D camera 26 and/or the RGB camera 28. The technology discussed herein may user an IR light component and sensor referred to as an image detector 600 in FIGS. 3 and 4. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras or sensors that may view a scene from different angles, to obtain visual stereo data that may be resolved to generate depth information.

The capture device 20 may further include a microphone 30, or an array of microphones for use as inputs to the target recognition, analysis, and tracking device.

In an example embodiment, the capture device 20 may further include a processor or microcontroller 32 that may be in operative communication with the image camera component 22. The processor 32 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the microcontroller 32, images or frames of images captured by the 3-D camera 26 or RGB camera 28, or any other suitable information, images, or the like. According to an example embodiment, the memory component 34 may include random access memory (RAM), read only memory (ROM), cache, Flash memory, a hard disk, or any other suitable storage component. Together, the microcontroller 32 and memory may be collectively referred to as a microcontroller.

As shown in FIG. 1, in one embodiment, the memory component 34 may be a separate component in communication with the image capture component 22 and the processor 32. According to another embodiment, the memory component 34 may be integrated into the processor 32 and/or the image capture component 22.

As shown in FIG. 1, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor.

Figure 2:
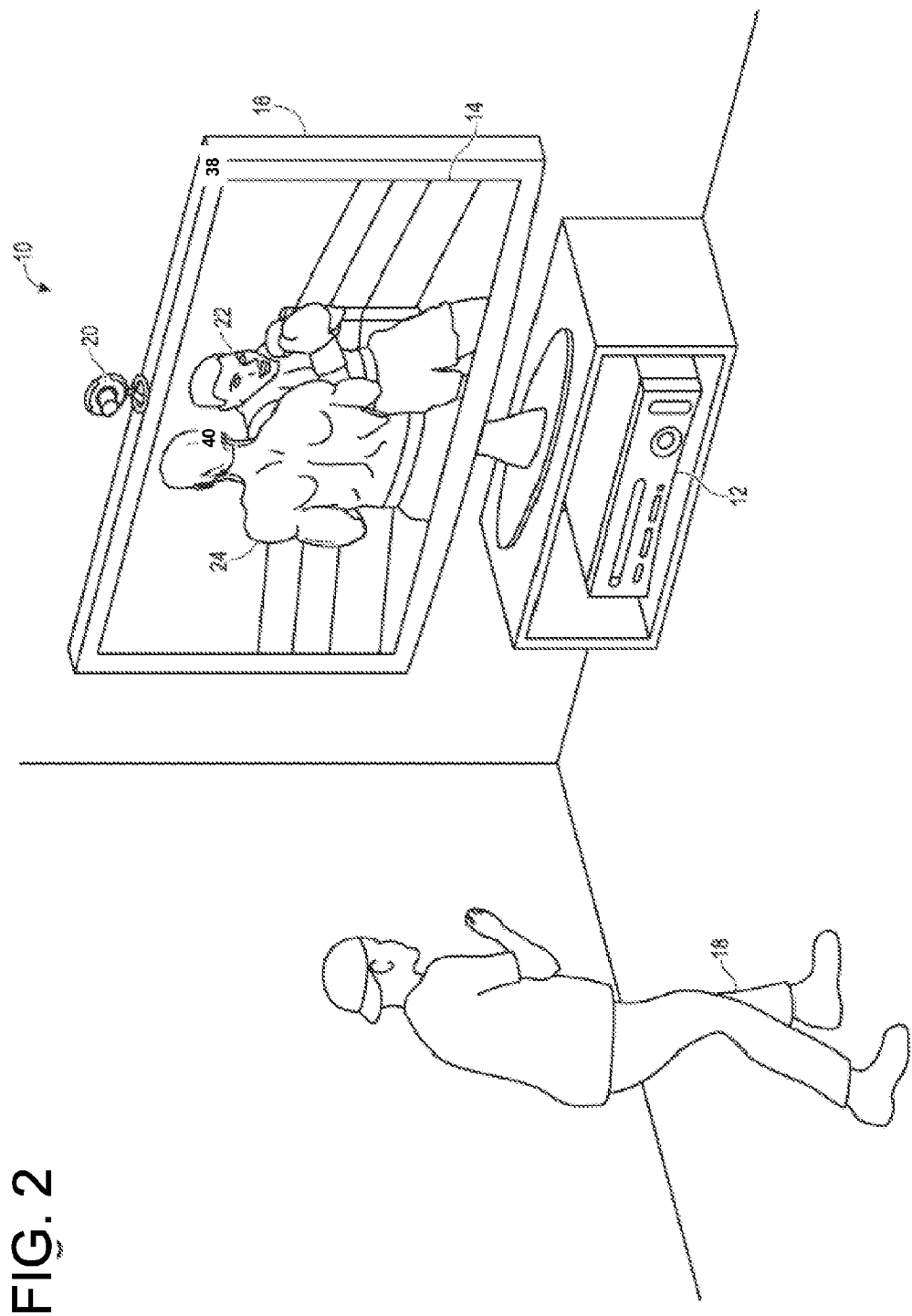
FIG. 2 illustrates an example embodiment of a capture device that may be used as part of the tracking system.
Figure 5:
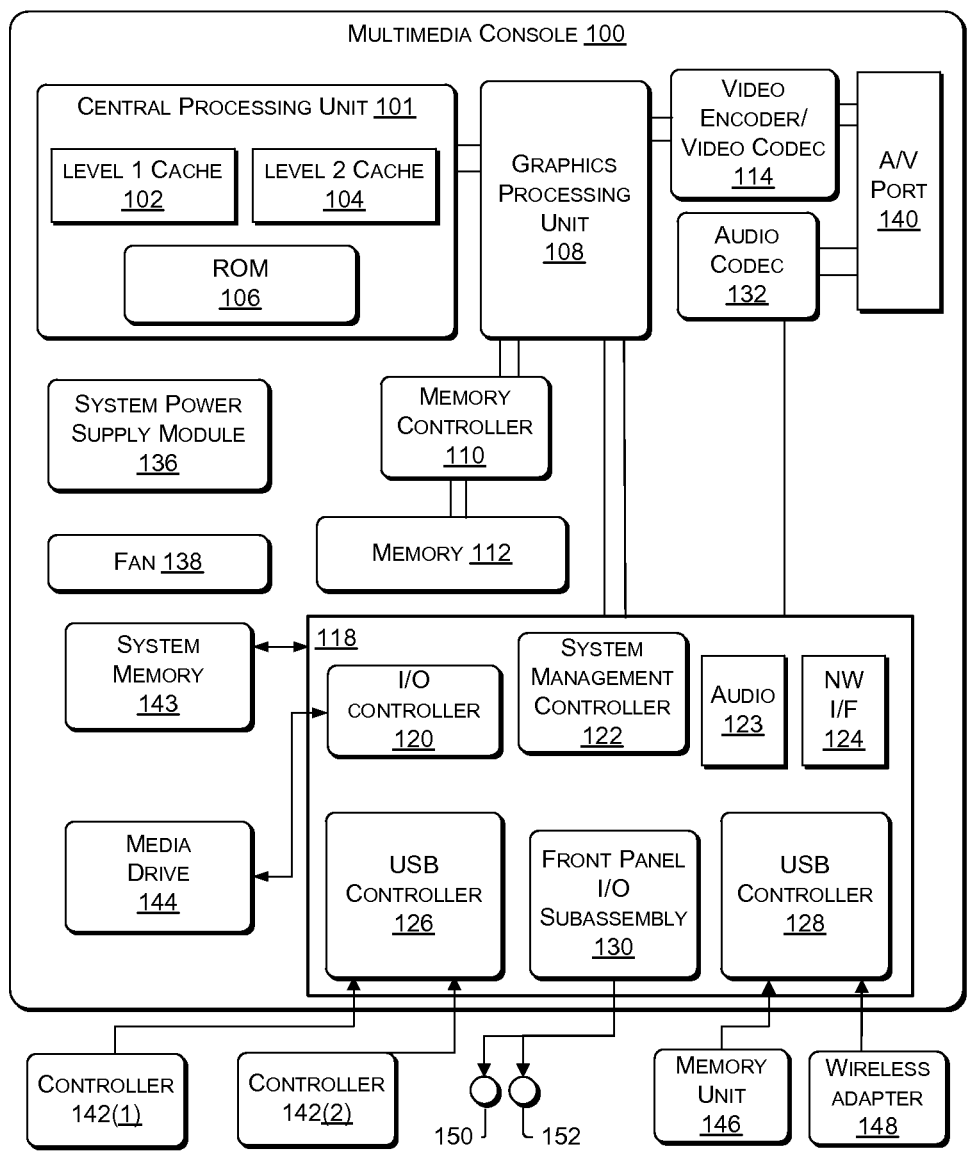
FIG. 5 depicts an example of a processing device that may be used to track motion and execute an application based on the tracked motion.

Computing environment 12 may include components such as those illustrated in FIGS. 5 and 6 to enable operation of applications using the depth information provided by the capture device. Illustrated logically in FIG. 2 are an operating system 180, a depth/image processor 185, a sensor input 52, a video output and an application 195. The elements in FIG. 2 within computing system 12 may be enabled by one or more hardware components and a processor which is specifically programmed to execute instructions to accomplish the techniques described herein.

Depth image processing module 185 uses the depth images to track motion of objects, such as a user and other objects, and provide information to the application 195 for use by the application in any number of ways. In one embodiment, depth image processing and object reporting module 185 will report to operating system 180 an identification of each object detected and the location of the object for each frame. Operating system 180 will use that information to update the position or movement of an avatar or other images in the video output or to perform an action on a user-interface.

Information is provided to the depth image processor 185 by sensor input 52. Sensor input 52 receives data of a scene which includes data representative of the target in a physical space, via the capture device 20. Depth/image processing module 185 provided in the computing environment that can process the depth image to determine what targets are in a scene, such as a user 18 (FIG. 2) or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

Video output 56 provides a rendering of the output of an application 185 being used on computing device 12. The video output 56 will comprise a stream of unique consecutive images at a given frame rate.

In an embodiment, the capture device 20 via the 3-D camera 26 and/or the RGB camera 28 detects information on a scene. Each of the sensors may provide information in a series of data (or image) frames separated by a wait interval.

As used herein, a computing environment 12 may refer to a single computing device or to a computing system. The computing environment may include non-computing components. The computing environment may include a display device, such as display device 14 shown in FIG. 1. A display device may be an entity separate but coupled to the computing environment or the display device may be the computing device that processes and displays, for example. Thus, a computing system, computing device, computing environment, computer, processor, or other computing component may be used interchangeably.

FIG. 2 illustrates an example embodiment of a motion detection and tracking system 10 which can be used with the present technology. One use of the exemplary tracking and rendering system 10 is where a user 18 plays a game. In FIG. 2 the example is the user playing a boxing game. In an example embodiment, the system 10 may be used to recognize, analyze, and/or track a human target such as the user 18 or other objects within range of tracking system 10. The system generates action on the display 14 of a monitor or television 16 that may include an avatar 24 which follows actions of the user 18 as well as responds to actions of a computer generated game character 22 in a boxing match.

As shown in FIG. 2, tracking system 10 may include a computing system 12. The computing system 12 may be a computer, a gaming system or console, or the like. According to an example embodiment, the computing system 12 may include hardware components and/or software components such that computing system 12 may be used to execute applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 2, tracking and rendering system 10 may further include a capture device 20. According to one embodiment, the tracking and rendering system 10 may be connected to an audio/visual device 16 such as a television, a monitor, a high-definition television (HDTV), or the like that may provide game or application visuals and/or audio to a user such as the user 18. For example, the computing system 12 may include a video adapter such as a graphics card and/or an audio adapter such as a sound card that may provide audio/visual signals associated with the game application, non-game application, or the like. The audio/visual device 16 may receive the audio/visual signals from the computing system 12 and may then output the game or application visuals and/or audio associated with the audio/visual signals to the user 18. According to one embodiment, the audio/visual device 16 may be connected to the computing system 12 via, for example, an S-Video cable, a coaxial cable, an HDMI cable, a DVI cable, a VGA cable, component video cable, or the like.

Suitable examples of a system 10 and components thereof are found in the following co-pending patent applications, all of which are hereby specifically incorporated by reference: U.S. patent application Ser. No. 12/475,094 entitled "Environment And/Or Target Segmentation", filed 29 May 2009 and hereby fully incorporated herein by reference; U.S. patent application Ser. No. 12/511,850, entitled Auto Generating a Visual Representation, filed 29 Jul. 2009, fully incorporated herein by reference; U.S. patent application Ser. No. 12/474,655, "Gesture Tool" filed on May 29, 2009, and hereby fully incorporated herein by reference; U.S. patent application Ser. No. 12/603,437, "Pose Tracking Pipeline," filed on Oct. 21, 2009. (hereinafter referred to as the '437 application), and hereby fully incorporated herein by reference; U.S. patent application Ser. No. 12/475,308, "Device for Identifying and Tracking Multiple Humans Over Time," filed on May 29, 2009, and hereby fully incorporated herein by reference; "Motion Detection Using Depth Images," filed on Dec. 18, 2009, and hereby fully incorporated herein by reference; and U.S. patent application Ser. No. 12/575,388, "Human Tracking System," filed on Oct. 7, 2009, and hereby fully incorporated herein by reference; U.S. patent application Ser. No. 12/422,661, "Gesture Recognizer System Architecture," filed on Apr. 13, 2009 and hereby fully incorporated herein by reference; U.S. patent application Ser. No. 12/391,150, "Standard Gestures," filed on Feb. 23, 2009 and hereby fully incorporated herein by reference; and U.S. patent application Ser. No. 12/474,655, "Gesture Tool" filed on May 29, 2009, and hereby fully incorporated herein by reference.

Figure 3:
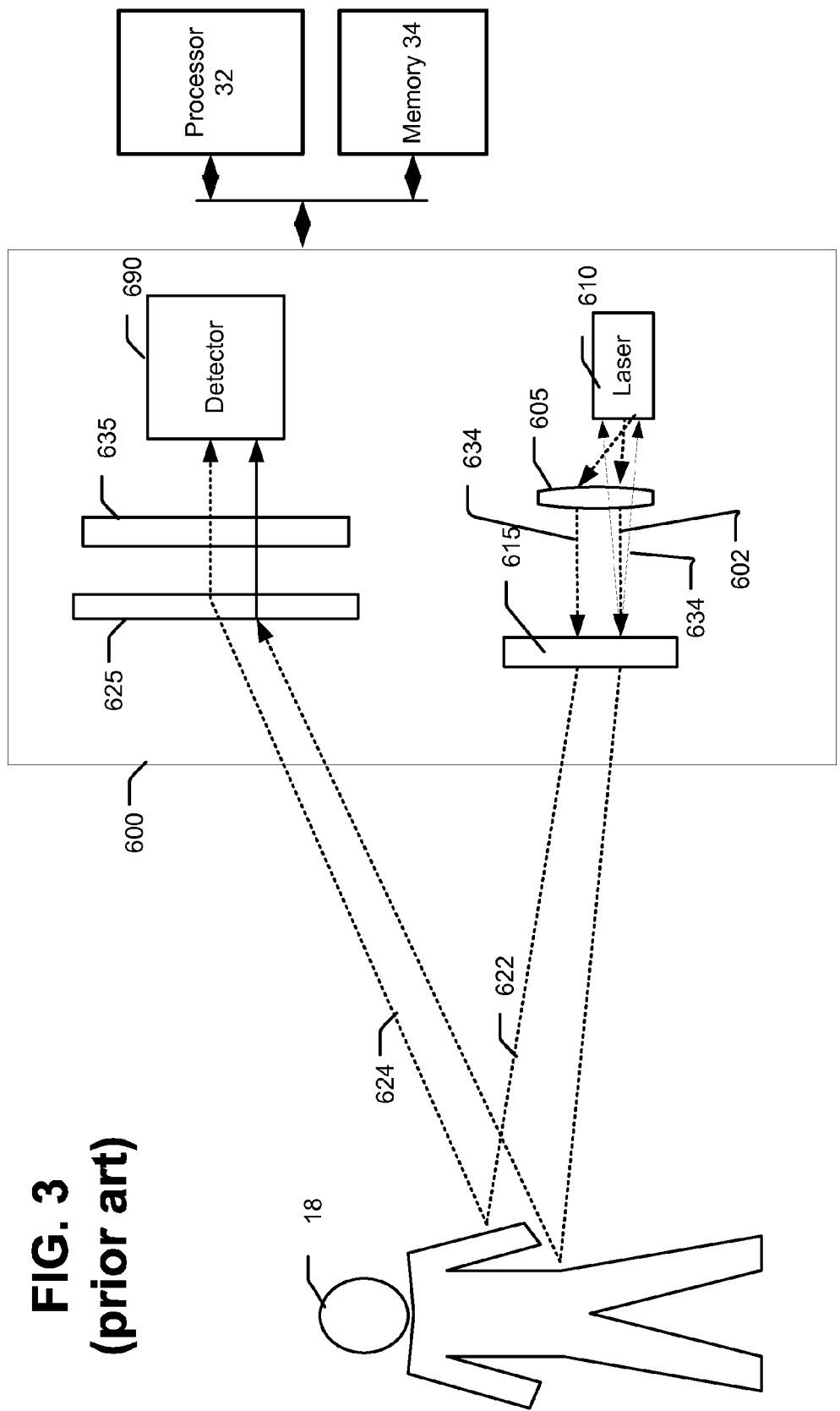
FIG. 3 is a prior embodiment of a depth illumination optical device.

FIG. 3 illustrates one embodiment of an image detector 600 which may be used in a capture device 20 such as that illustrated in FIG. 1. The image detector includes an IR light component or illumination source comprising a laser 610 and associated optical elements 605, 615, and a sensor 26 comprising detector 690 including optical elements 625 and 635. In one embodiment, the illumination source is a laser diode 610 emitting a non-collimated illumination radiation. The illumination radiation from the laser 610 is collimated by collimating lens 605 into collimated beams 634 and provided to diffractive optics 615. It will be recognized that a single transverse mode laser having a collimated output may be used in place of a laser diode and collimating lens 605. The technology presented herein may be used with any number of different image capture devices, but is particularly applicable to user with a depth detection system.

Optics 615 create a random or systematic light pattern 622 to illuminate a target such as user 18. The reflected illumination radiation 624 is collected by a collection lens 625 and a filter 635, which directed the reflected, filtered image to a detector 690.

In one embodiment the laser 610 outputs illumination in the infrared (IR) band. In such embodiment, the filter 635 may be a narrow band IR filter which is matched to the output wavelength of the laser. The detector 690 may be a CMOS array of collection elements. In this type of system, the performance of the system is very sensitive to the stability of the wavelength due to the influence of wavelength on the specific diffractive pattern from the diffractive optics 615 and the matching of the laser wavelength to the transmission region of the narrow bandpass filter 635.

One issue with the design in FIG. 3 is the stability of the wavelength of the laser. As illustrated in FIG. 3, while lasers operating at constant current and temperatures have negligible wavelength fluctuations, the additional output optics, such as the diffractive elements 615, may cause radiation 602 to be scattered back to the laser diode cavity, thus creating instability in the wavelength. In addition, when the coherent light from the laser is re-imaged to the detector 690, there may be noise in the form of a speckle pattern in the reflection 624.

Figure 4:
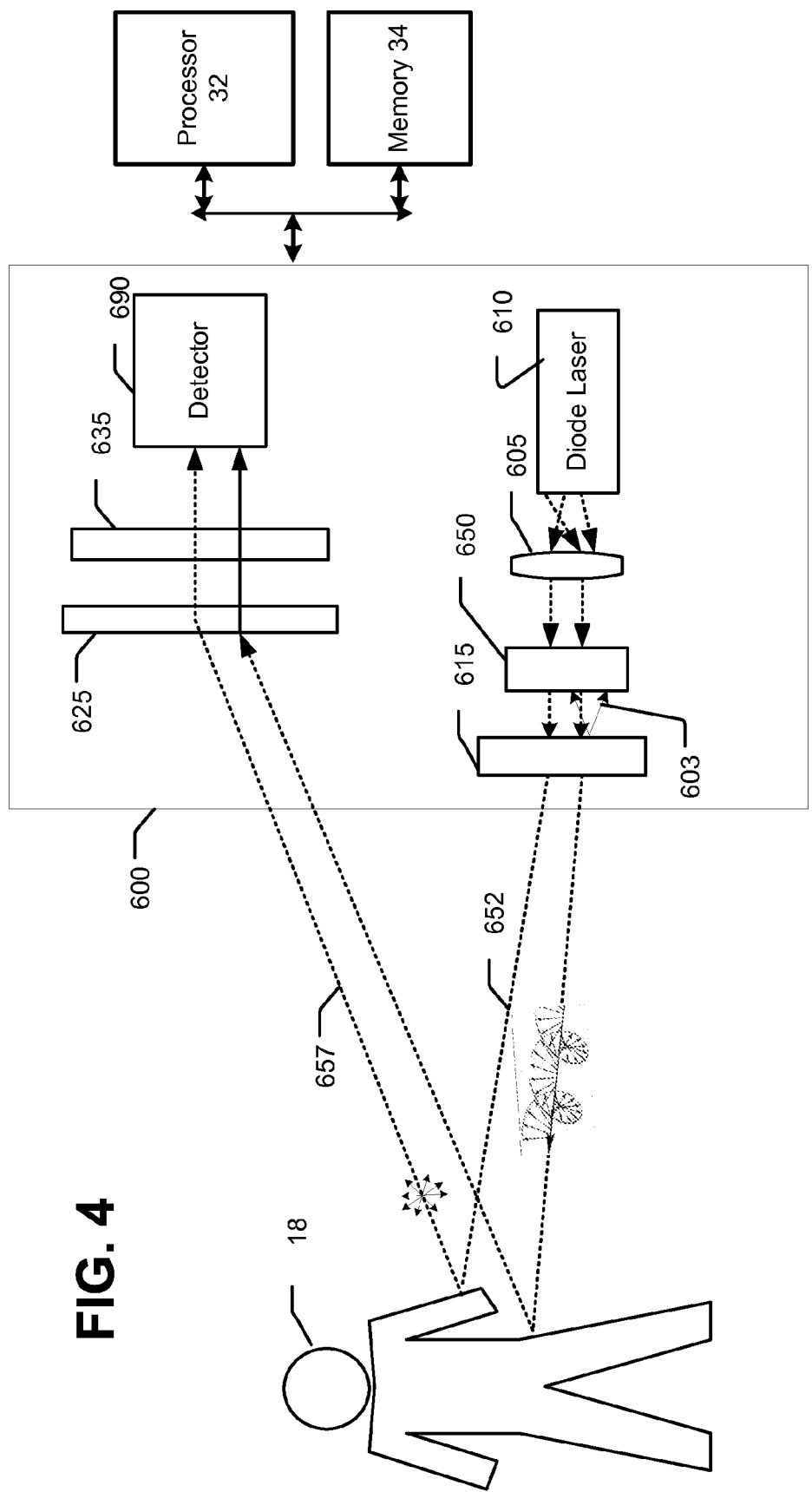
FIG. 4 is an embodiment of a depth illumination optical device in accordance with the present technology.

FIG. 4 illustrates an image detector in accordance with the present technology. In FIG. 4, a circular polarization structure is provided between the collimating lens 605 and the diffractive optical element 615. In one embodiment, the circular polarization structure 650 comprises a linear polarization element followed by a quarter wave plate. A linear polarizing filter followed by a quarter-wave plate, whose slow and fast axes are at 45° to the axis of the polarizer, becomes a circular polarizing filter and incident un-polarized light emerges as circularly polarized light.

As illustrated in FIG. 4, illumination radiation is provided by the laser diode and converted collimated illumination radiation by the collimating lens. A linear polarizer converts the collimated illumination radiation to polarized illumination radiation 652 and the quarter wave plate creates circularly polarized illumination radiation which is dispersed by the diffractive optics 615 and is directed at 652 to a target such as user 10. Any reflection 603 of the circularly polarized beam which returns to the circular polarization element 650 is blocked by the circular polarization element. This is due to the fact that as light emerges from the circular polarizer 650, the light will have a right handed or left handed polarization. In FIG. 4, beam 652 is right handed while reflections 603 is left hand polarized and reflection 657 is depolarized or partially polarized. Reflected illumination radiation 603 which results from circularly polarized illumination radiation incident on diffractive optics 615 will have a circular polarization of opposite handedness —that is, right handed polarized illumination radiation will be reflected as left handed polarized radiation 655. When the oppositely polarized reflected beam impinges on the circular polarizer 650, transmission through the circular polarizer will be blocked. Any light reflected from the diffractive optical element surfaces will then be converted back to linear polarized light but in an orientation orthogonal to the original orientation. This orthogonal polarization state will not interact with the emitted mode of the laser and thus not cause the laser to become unstable. If additional isolation is required, a polarizer (aligned to the orientation of the original polarizer) can be inserted before the quarter wave plate thus absorbing any energy reflected.

In addition, because the output illumination radiation 652 consists of a circular polarization beam, and circular polarization consists of two orthogonal linear polarized states at 90 degrees phase difference, speckle effects cannot be formed by both beams together. These two orthogonal states cannot interact and thus cannot form speckle on reflection. The user of circular polarization can be shown to reduce the degree of speckle (when measured as the speckle contrast ratio) by a factor of the square root of 2.

FIG. 5 illustrates an example embodiment of a computing system that may be the computing system 12 shown in FIG. 2 used to track motion and/or provide depth and tracking information to an application. The computing system such as the computing system 12 described above with respect to FIGS. 1-2 may be a multimedia console 100, such as a gaming console. As shown in FIG. 5, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the AN port 140 for reproduction by an external audio user or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaining applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100 via USB controller 126 or other interface.

FIG. 6 illustrates another example embodiment of a computing system 220 that may be used to implement the computing system 12 shown in FIGS. 1-2 in a motion detection and tracking system. The computing system environment 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 6, provide storage of computer readable instructions, data structures, program modules and other data for the computer 241. In FIG. 6, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100 that connect via user input interface 236. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates application programs 248 as residing on memory device 247. It will be appreciated that the network connections shown are exemplary and other means of establishing a communications link between the computers may be used.

Either of the systems of FIG. 5 or 6, or a different computing system, can be used to implement Computing System 12 of FIG. 1. As explained above, computing system 12 may, in one embodiment, determine the motions of the users and employ those detected motions to control a video game or other application. For example, a user's motions can be used to control an avatar and/or object in a video game. In some embodiments, the system can simultaneously track multiple users and allow the motion of multiple users to control or effect the application.

The system will use the RGB images and depth images to track a user's movements. For example, the system will track a skeleton of a person using a depth images. There are many methods that can be used to track the skeleton of a person using depth images. One suitable example of tracking a skeleton using depth images is provided in U.S. patent application Ser. No. 12/603,437, "Pose Tracking Pipeline," filed on Oct. 21, 2009. (hereinafter referred to as the '437 application), incorporated herein by reference in its entirety. The process of the '437 application includes acquiring a depth image, down sampling the data, removing and/or smoothing high variance noisy data, identifying and removing the background, and assigning each of the foreground pixels to different parts of the body. Based on those steps, the system will fit a model with the data and create a skeleton. The skeleton will include a set of joints and connections between the joints.

In one embodiment, in order for a user's motion to be used to control an application the user must first be enrolled or bound to the application. In one embodiment, each user will be asked to identify himself or herself by standing in front of the system so that depth images and/or visual images can be obtained from multiple angles for that user. For example, the user may be asked to stand in front of the camera, turn around, and make various poses while depth images and visual images are obtained. After the system obtains enough depth and/or visual images, the system will create a set of identifying data from the images that uniquely identifies the user. The system will create a unique identification and associate that unique identification with on-screen representation (e.g., avatar) or other object in the game/application. After a user is enrolled in (or bound to) the application, the system will track the motion of that user while the user is actively engaged with the application (e.g., playing the game or using the application). However, in the past, other people in the room who are not actively engaged with the application, (e.g., not bound to application, bound to application but not playing current game, or bound to application but currently not having a turn to play) do not have a way to interact with the application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A depth detection system that illuminates a scene with infrared radiation in order to obtain depth images of the scene based on reflections of the infrared radiation that are within a narrow infrared band, comprising:
  a depth image detector, comprising:
    an illumination source adapted to output collimated infrared illumination radiation sufficient to illuminate a scene including multiple objects;
    a circular polarization structure including a quarter wave plate positioned to receive collimated linearly polarized infrared illumination radiation having a first linear polarization orientation and to output a circularly polarized collimated infrared beam;
    a diffractive optics structure positioned adjacent to the circular polarization structure and adapted to receive the circularly polarized collimated infrared beam and adapted to output a pattern of circularly polarized infrared illumination radiation to the scene to illuminate the multiple objects; and
    a detector adapted to receive a reflection of the pattern from the multiple objects, the detector including an array of collector elements covered by a filter tuned to the infrared illumination radiation output by the illumination source;
    the circular polarization structure, the illumination source and the diffractive optics structure positioned relative to one another such that the circular polarization structure blocks from being incident on the illumination source, at least a portion of the infrared illumination radiation that, after being output by the illumination source, is scattered back from the diffractive optics structure towards the illumination source; and
    the circular polarization structure, the illumination source and the diffractive optics structure positioned relative to one another such that at least a portion of the infrared illumination radiation that is scattered back from the diffractive optics structure towards the illumination source, by the diffractive optics structure, is converted from circularly polarized infrared illumination radiation to linearly polarized infrared illumination radiation having a second linear polarization orientation that is orthogonal to the first linear polarization orientation.

2. The depth detection system of claim 1 wherein the circular polarization structure comprises the quarter wave plate and a linear polarizer, and wherein linear polarizer and the quarter wave plate of the circular polarization structure are positioned relative to one another and relative to the illumination source and the diffractive optics structure to block, from reaching the illumination source, the portion of the illumination radiation that is scattered back from the diffractive optics structure toward the illumination source, to thereby improve wavelength stability of the illumination source.

3. The depth detection system of claim 1 wherein the illumination source is a laser adapted to output linearly polarized infrared illumination radiation having the first linear polarization orientation.

4. The depth detection system of claim 1 wherein the pattern of circularly polarized infrared illumination radiation, which the diffractive optics structure is adapted to output to the scene, comprises a grid or stripe pattern of the circularly polarized infrared illumination radiation.

5. The depth detection system of claim 1 further comprising:
  a processor and memory including code to process the pattern reflected from the multiple objects in the scene and received by the detector to generate a plurality of depth images; and
  a computing device adapted to detect motion of one or more of the multiple objects in the scene based on the plurality of depth images.

6. The depth detection system of claim 1 wherein the array of collector elements of the detector comprises a CMOS array.

7. The depth detection system of claim 1 wherein the illumination source comprises a laser diode outputting non-collimated infrared illumination radiation and a collimating lens receiving the non-collimated infrared illumination radiation and outputting the collimated infrared illumination radiation.

8. The depth detection system of claim 1 wherein the illumination source comprises:
  a cavity laser outputting the collimated illumination radiation; or
  a laser diode and a collimating lens.

9. A motion detection and tracking system, comprising:
  a capture device in a housing including:
    a laser outputting infrared illumination radiation sufficient to illuminate a scene including multiple objects;
    a collimating lens positioned to receive the infrared illumination radiation and provide collimated infrared illumination radiation;
    a diffractive optical element positioned such that backscatter therefrom of the infrared illumination radiation back toward the laser would cause instability in the laser absent an intervening circular polarization structure that includes a linear polarization element and a quarter wave plate;
    the intervening circular polarization structure adapted to block, from reaching the laser, the infrared illumination radiation that is backscattered from the diffractive optical element, to thereby maintain stability of the laser;
    the linear polarization element of the circular polarization structure positioned between the collimating lens and the diffractive optical element and adapted to receive the collimated infrared illumination radiation and provide a linearly polarized output having a first linear polarization orientation;
    the quarter wave plate of the circular polarization structure positioned to receive the polarized output of the linear polarization element and adapted to provide circularly polarized output illumination radiation such that the diffractive optical element thereby outputs circularly polarized infrared illumination radiation in a pattern to illuminate the scene including the multiple objects; and
    a detector adapted to receive a reflection of the pattern from the multiple objects, the detector including a narrow band infrared filter which is matched to an output wavelength of the laser.

10. The motion detection and tracking system of claim 9 wherein the linear polarization element is positioned to receive the collimated infrared illumination radiation and provide linearly polarized infrared illumination radiation having the first linear polarization orientation to the quarter wave plate.

11. The motion detection and tracking system of claim 10 wherein the quarter wave plate outputs circularly polarized infrared illumination radiation to the diffractive optical element.

12. The motion detection and tracking system of claim 11 wherein the pattern of circularly polarized illumination radiation, which the diffractive optical element outputs to illuminate the scene, comprises a grid or stripe pattern of the circularly polarized infrared illumination radiation.

13. The motion detection and tracking system of claim 9 further comprising:
a processor and memory including code to process the pattern reflected from the multiple objects in the scene and received by the detector to generate a plurality of depth images; and
a computing device adapted to detect motion of one or more of the multiple objects in the scene based on the plurality of depth images.

14. The motion detection and tracking system of claim 9 wherein the detector further includes a CMOS array that is covered by the narrow band infrared filter which is matched to the output wavelength of the laser.

15. A motion detection and tracking system, comprising:
a motion capture device including:
a laser diode having an infrared illumination radiation output sufficient to illuminate a scene including multiple objects;
a collimating lens positioned at the output of the laser diode to provide a collimated infrared beam;
a diffractive optical element positioned such that backscatter therefrom of infrared illumination radiation back toward the laser diode would cause instability in the laser diode absent intervening optical elements;
the intervening optical elements comprising a linear polarization element positioned adjacent to the collimating lens and providing an output and a quarter wave plate positioned adjacent to the linear polarization element and receiving the output of the linear polarization element, the quarter wave plate outputting a circularly polarized beam;
the diffractive optical element positioned adjacent to the quarter wave plate and configured to output a pattern of the circularly polarized beam to illuminate the scene including multiple objects; and
a detector positioned to receive a reflection of the pattern from the multiple objects, the detector including a narrow band infrared filter which is matched to an output wavelength of the laser diode.

16. The motion detection and tracking system of claim 15 wherein the quarter wave plate has slow and fast axes that are at 45° to an axis of the linear polarization element.

17. The motion detection and tracking system of claim 16 wherein the diffractive optical element is adapted to output a grid or stripe pattern of the circularly polarized beam.

18. The motion detection and tracking system of claim 15 wherein the diffractive optical element is adapted to output a random or systematic pattern of the circularly polarized beam.

19. The motion detection and tracking system of claim 15 wherein the motion capture device further includes a microprocessor coupled to the detector and including code to process the pattern reflected from the multiple objects in the scene and received by the detector to generate a plurality of depth images; and wherein the motion detection and tracking system further includes a processing device adapted to detect motion of one or more of the multiple objects in the scene based on the plurality of depth images.

20. The motion detection and tracking system of claim 15 wherein the detector further includes a CMOS array that is covered by the narrow band infrared filter which is matched to the output wavelength of the laser diode.

* * * * *